United States Patent [19]

Scott et al.

[11] 4,156,595

[45] May 29, 1979

[54] FORMCOKE PROCESS AND APPARATUS

[75] Inventors: Robert H. Scott; Jimmy B. Smith, both of Columbia, Tenn.

[73] Assignee: Peabody Coal Company, St. Louis, Mo.

[21] Appl. No.: 913,852

[22] Filed: Jun. 8, 1978

[51] Int. Cl.² .......................... C10L 5/00; B30B 11/00; C10B 53/00
[52] U.S. Cl. ........................................ 44/10 C; 44/13; 44/15 R; 44/16 E; 201/6; 201/24; 201/32; 201/40
[58] Field of Search ...................... 44/1 F, 10 C, 10 K, 44/11–13, 16 F; 201/6, 8, 18, 24, 32, 40

[56] References Cited

U.S. PATENT DOCUMENTS

| | | | |
|---|---|---|---|
| 1,918,162 | 7/1933 | Willson | 201/24 |
| 3,185,635 | 5/1965 | Creglow | 201/6 X |
| 3,434,932 | 3/1969 | Mansfield | 201/32 X |
| 3,441,480 | 4/1969 | Ban | 201/32 X |
| 3,684,465 | 8/1972 | Hsu | 44/16 F |
| 3,883,399 | 5/1975 | Nire | 201/6 |
| 4,039,319 | 8/1977 | Schapiro | 44/10 C |

*Primary Examiner*—Carl Dees
*Attorney, Agent, or Firm*—Littlepage, Quaintance, Murphy, Richardson and Webner

[57] ABSTRACT

A process for producing formcoke composed of char and selected binders comprising process steps in which non-oxidative thermal carbonization is employed.

17 Claims, 1 Drawing Figure

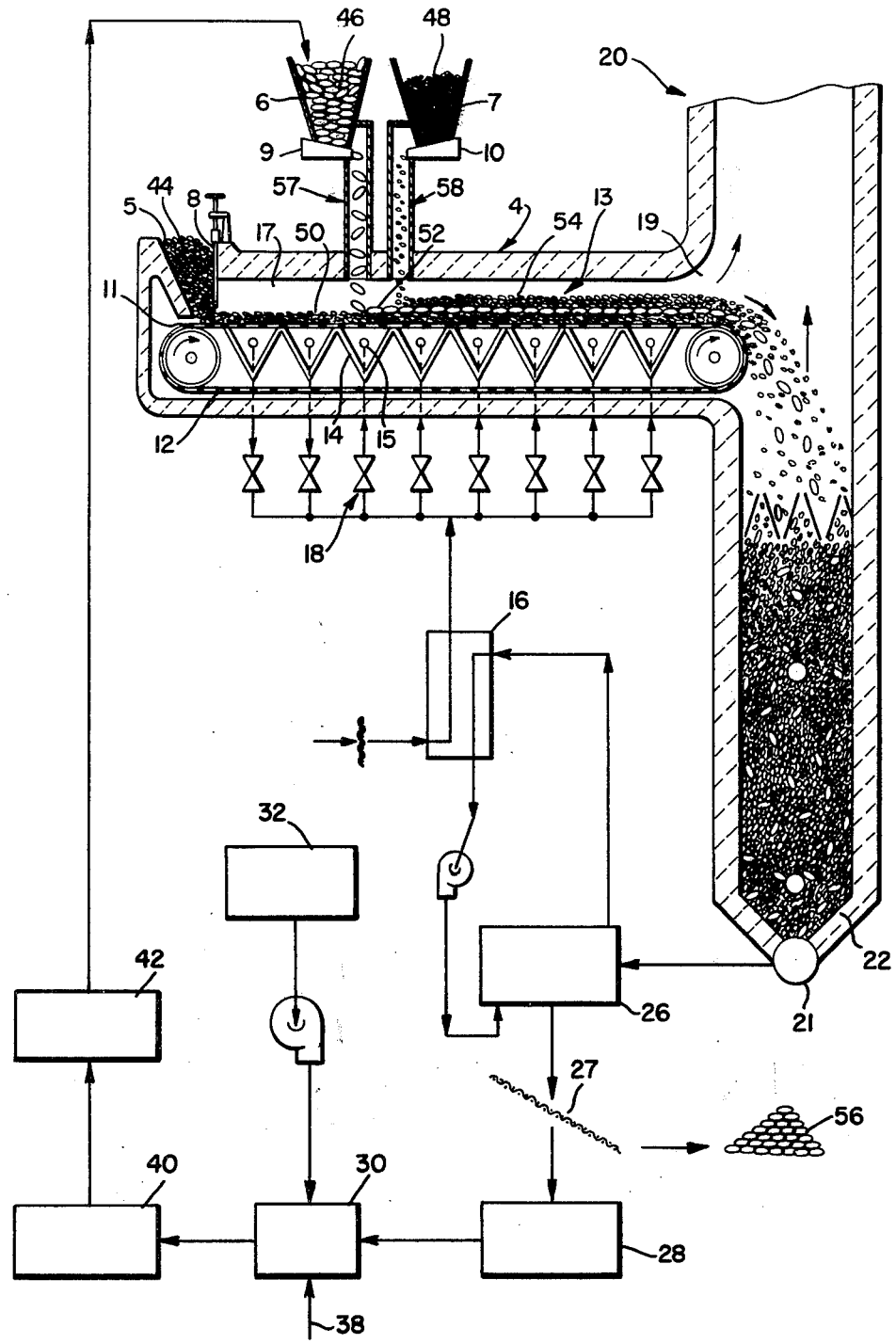

FORMCOKE PROCESS AND APPARATUS

BACKGROUND OF THE INVENTION

It is known to produce formcoke composed of char and pitch in a closed system as exemplified by Mansfield and Whitten in U.S. Pat. No. 3,969,088. This process requires an oxidative heat treatment to polymerize the binder. The polymerization is necessary in order that the formed shapes be able to withstand carbonization thermal treatments without deforming. While oxidative thermal treatment is necessary for the pitch type binder disclosed by Mansfield et al. it is often not desirable for binders which require only a thermal treatment to obtain the final carbonized product. Additionally, it is often not desirable to use a pitch as a binder because of cost and availability.

Therefore, it is an object of the present invention to provide a process for producing formcoke which employs a wide variety of binders.

Another object of the present invention is to provide a non-oxidative atmosphere for thermal treatment of the formed shapes.

Additional objects and advantages of the present invention will be apparent to those skilled in the art by reference to the following detailed description and drawing wherein:

FIG. 1 is a diagram describing the sequence of process steps in the present invention.

The above and other objects are accomplished according to the present invention by providing a process comprising the steps of:

introducing sized green coal onto a moving chain grate to form a green coal layer, introducing green briquets uniformly onto the green coal layer to form a green briquet layer, introducing added green coal onto the green briquet layer in an amount to cover the green briquets and the interstices between the green briquets wherein the green coal layer, the green briquet layer and added green coal altogether form a bed, and charring the bed and reducing the volatile content of the briquets by introducing preheated oxygen containing gas, conveying the char and briquets to a post-treatment carbonizer having a reducing atmosphere to further reduce the volatile content of the char and briquets, passing the char and briquets, from the post-treatment carbonizer through a cooler, separating the char from the briquets, crushing the char, mixing the char with a binder, forming the mixture of char and binder into wet green briquets, drying the wet green briquets to produce dry green briquets, and employing the dry green briquets in the bed.

Green coal suitable for use in the present invention can be of widely variant types, i.e., ranging from very low rank brown coal to semi-anthracite. The volatile content of the coal can vary greatly. The volatile content of the coal is greater than 14% and generally between 25 and 50 percent by weight on a moisture and ash free basis. The coal is preferably sized 1.5×0 inch. This means that the pieces of coal pass through a wire mesh screen the wires being spaced 1 and ½ inches apart. In sizing the coal sizes smaller than 1½ inches are not retained, but it is generally preferred that no more than a maximum of about 40% is minus ¼ inch coal.

The coal added on top of the briquet bed is generally the same type as the sized coal. The size of this can vary greatly but generally the added coal varies from 1.5×0 inches to 0.25×0 inches. This coal is obtained by grinding the coal used for the sized coal, by screening a fraction from the sized coal, or by using part of the sized coal. The preferred coal size for the coal added onto the briquets is determined by the size of the briquets since the function of this coal is to fill the interstices between the briquets. For example, if 4 inch briquets were produced, a larger coal size such as 2 inches would be allowable. However, if ⅜ inch briquets were produced, it might be desirable to size the coal at minus ¼ inch. Briquet size is determined by the end use of the briquet. The volatile content of this coal is the same as that of the green sized coal if the same source is used for the coal. Generally the volatile content of this coal is greater than 14% and varies from 25 to 50% by weight on a moisture and ash free basis.

Of course, coal of greater size can be used. However, too large sizes of coal make it difficult to control the carbonization of the bed because of the large air spaces. Also, too large sizes of coal will increase the carbonization time required. On the other hand, too small pieces of coal make it difficult to pass the undergrate gas through the coal bed because of low bed porosity. This can necessitate the use of high undergrate gas pressure which can increase the entrainment of coal particles in the gases evolved from the bed. The coal added on top of the green briquet bed is intended to surround the green briquets in the bed and contain them in a reducing atmosphere. Therefore, too large pieces of sized coals do not adequately surround the briquets. Alternatively, too small a size of added coal requires that excessive amounts of coal be used to surround the briquets. This can cause the porosity of the briquet and coal layer to be so low that the necessary amount of undergrate gas cannot be passed through the bed without excessive entrainment of particulates. Also, the heat transfer characteristics of excessively fine coal are so poor that the fine coal and briquets are not heated to the required carbonization temperature on the traveling grate.

Binders suitable for non-oxidative thermal carbonization of green briquets include furan, coal, clay, Bentonite, low temperature chars, solvent refined coal, iron ore, molasses, lime, lignosulfonates and various combinations of these binders. Because of cost and availability lignosulfonate type binders are preferred and the calcium salt of lignosulfonate is most preferred.

The lignosulfonate binder is a mixture of complex polymeric metallic sulfonate salts which are by-products from wood pulping. They are metallic sulfonate salts from the lignin of sulfite pulp-mill liquors. The salts may be most metals, but are generally available as calcium, sodium, or ammonium salts. Calcium salts are preferred. The pH of the lignosulfonate is generally about 3, but it can be adjusted to other pHs with no adverse effect. The viscosity is generally 50–5000 cps, preferably 100–3000 and ideally 300. The viscosity is easily adjusted by varying the temperature or water content. Molecular weights range from 1000 to 20,000. The solids content is generally about 50% from commercial suppliers which is a reflection of pumping convenience. It is also commercially available as a spray-dried product. The solids content may be adjusted to vary between 30 to 90%, but is generally 50 to 70%. If the solid content is too low when used to mix with the char, the green briquets have insufficient wet strength. At higher solids content, the lignosulfonate is difficult to mix.

The present process is a closed system. In initially forming the bed the proportion of green coal to the green coal added on top of the briquet bed can vary greatly particularly depending on the size of the bed desired and the rank of the coal. Generally, the proportion by weight of green coal to added coal can vary from 2:1 to 20:1. Added coal from 10 to 30% based on the combined weight is typical. The proportion of green coal and added coal to green briquets similarly can vary greatly and is dependent on the rank of the coal and the desired volatile matter content of the formcoke. However, generally the amount of combined coal to briquets is 1.3:1 to 3:1 by weight. Too small an amount of coal added on top of the briquets results in insufficient protection of the briquets from oxidizing atmospheres. Too large an amount of coal added on top of the briquets results in a coal bed beneath the briquets that is too thin to consume the oxygen introduced beneath the grate. Therefore, the surfaces of the briquets in the lower layers of the bed will be oxidized.

The ratio of the green coal, green briquets and added coal can vary greatly. Ratios typically used range from 70:20:10 to 40:40:20.

Generally the bed has a depth of 2 to 12 inches and preferably 4 to 8 inches. Too deep a bed results in too slow a process and too thin a bed will allow the briquet surfaces to be oxidized and will reduce the throughput of the process.

The weight ratio of binder to char on a solid basis is generally 1:100 to 40:100, preferably 3:100 to 20:100 and ideally 7:93. If insufficient binder is used the resultant briquets do not have sufficient strength. If an excess of binder is used valuable heat content of the formcoke is lost.

The green briquets and the finished briquets have a size of about 2×2×1½ inches. Briquet sizes can of course vary depending on the desired size of the finished product and on the type of briquetter used. The dimensions of the briquets and coal conveniently are chosen so that a screen can be used in separation. Wide variation is possible as long as the sizes are maintained relative one to the other.

The process for practicing the invention can be readily apprehended by following the diagram as shown in FIG. 1. The carbonizer 4 has inputs here shown by hopper 5, and conduits 57 and 58. Green coal 44, preferably of size 1.5 by 0 inch, is charged to hopper 5 and then spread by gate 8 to form a coal layer 50 on the continuously moving chain grate 12. Green briquets 46 are charged to hopper 6 through gate 9 and through shaft 57 to form a green briquet layer 52 on top of coal layer 50. Added coal 48 is charged to hopper 7 and through gate 10 and through shaft 58 to form a coal layer 54 on top of briquet layer 52. Shafts 57 and 58 are so arranged that the gases may freely flow throughout the carbonizer. Additionally, it is preferred to introduce the briquets after the coal is ignited, so chute 57 is usually arranged over the third undergrate air zone.

Briquets 46 and added coal 48 may be introduced simultaneously from one hopper 6 through shaft 57. However, separate additions are preferred. Hopper 5 is situated at input end 17 of carbonizer 4. Beneath the chain grate 12 is a zoned air box 14 having, for example, 8 zones inclusive, which are supplied with updraft air from an air supply 16 in amounts which are carefully controlled and limited by valves 18. The first 2 or 3 air boxes may be downdrafted for binder recovery. The amount of air is generally about one pound per pound of green coal. Undergrate air preheating is not necessary but is preferred. Undergrate air preheating is employed primarily to improve the thermal efficiency of the process. The temperature of the air passed through the bed is between 0° and 700° F. Exhaust gases from the system are taken off through a stack 20 at the output end 19 of carbonizer 4. Stack 20 may supply gases to a boiler (not shown). The 3 layers, green coal layer 50, briquet layer 52, and added coal layer 54 constitutes a bed 13. The bed travels through the length of the chain grate for residence time between 3 minutes and 2 hours, preferably between 10 minutes and 40 minutes and ideally 25 minutes. The temperature of the carbonizer 4 measured at the output end 19 of the carbonizer is generally between 800° and 4000° F. preferably between 1500° and 3000° F. and ideally 2000° F. Initially, the volatile content of the green briquets is generally between 3 and 20% and generally in excess of 5% by weight on a moisture and ash free basis and the volatile content of the coal is between 14 and 50% by weight on a moisture and ash free basis. At the output end 19 of carbonizer 4 the volatile content of the briquets has been reduced to 3 to 10%. and the volatile content of the coal which has been heated to form char is 3 to 10% and generally less than 6%. From the output end 19 of the chain grate 12 the material being treated falls into a post-treatment carbonizer 22 which in this instance is shown as the vertical shaft furnace having a reducing atmosphere, essentially a soaking pit. The temperature in the post-treatment carbonizer is generally 800° to 3000° F., preferably 1600° to 1800° F. and ideally 1700° F. The residence time in the post-treatment carbonizer 22 is generally 10 minutes to 3 hours, preferably 30 minutes to 2 hours, and ideally 1 hour. At the end of the residence time the char contains about 1 to 7% of volatiles by weight and usually about 2% volatiles by weight. The green briquets have been converted to fully charred briquets and have a volatile content of 1 to 7% and generally less than 3%. The briquets and char are removed from post-treatment carbonizer 22 by means of exit 21 and removed to cooler 26 where the material is cooled by inert gas to generally 600° F. or less and preferably 400° F. or less. From cooler 26 the char and briquets are moved to a separator 27. The briquets must be larger than the pieces of char which emerge from the cooler so that they will not pass through the separator 27 with the char if a screen is the separator. Alternatively, other means may be used for separating the briquets from the char in which event the size of the briquets is not important. The fully charred briquets 56 are retained by the separator 27 and are ready for use. The char is conveyed to crusher 28 where the char is sized to generally minus ¼ inch and then is conveyed to mixer 30. Binder from a binder supply 32 is pumped into mixer 30. If steam or water is required in the mixing it is supplied via a line 38. The temperature in the mixer is generally between 20° and 400° F. and preferably between 50° and 200° F. The mixture of crushed char and binder is conveyed to briquetter 40. The briquetter is a standard type which forms briquets of a size approximately 2 inches by 2 inches by 1½ inches. Alternatively, other agglomeration methods such as pelletizing may be used. The green briquets are conveyed to dryer 42 to reduce the water content in the green briquets. Some binders, such as solvent refined coal, would not require a drying step for the green briquets. Subsequently the green briquets are conveyed to hopper 6 for treatment in carbonizer 4.

An apparatus for producing formcoke is shown by the combination of carbonizer, shaft furnace, cooler, separator, crusher, mixer, briquettes and drier. A furnace 4 has input end 17 and output end 19 laterally spaced from one another. A substantially air-impervious endless grate 12 running horizontally in said furnace includes an upper grate run 11 running from the input end of the enclosure to adjacent the output end thereof. A means for driving said endless grate is arranged so that the upper grate run moves from the input end of the furnace towards the output end thereof. Hopper 5 is arranged for introducing coal 44 and is placed extending upwardly adjacent the input end of the enclosure and having a lower end disposed over the upper grate run 11. Conduits 57 and 58, for introducing green briquets and coal on top of these briquets, are located adjacent to each other positioned so that the briquets and additional coal are introduced onto the coal bed after it has ignited. The briquets are stored in hopper 6 and the added coal in hopper 7, released by gates 9 and 10 respectively. The zoned air boxes 14 are below the endless grate for introducing oxygen containing gas from supply 16. The air boxes may be downdrafted at the hopper end of the carbonizer as shown in the figure to provide for binder recovery. A means for controlling the temperature of the furnace (not shown) is also provided in the apparatus. A gas outlet conduit 17 communicating with the lower end of the upper grate run and a second shaft furnace 22 provides means for the exhaust gases to exit. Shaft furnace 22 descending from the output end of the first-named furnace is positioned to receive char and briquets off the endless grate and has an exit 21 for removing the char and briquets. A means is provided in order to convey the char and briquets from the shaft furnace to a cooler 26. The cooler has means for releasing the cooled char and briquets to a separator. The separator 27, which may be a screen, is positioned to separate the fully charred briquets 56 from the char. A crusher 28 receives the char from the separator 27. Crushed char from the crusher is conveyed to a mixer 30 and binder is added to the mixer 30 to produce a mixture of binder and char. The binder and char are conveyed to a briquetter 40 which forms the binder and char into green briquets. The green briquets are conveyed to a dryer 42 which dries the briquets and produces briquets suitable for use in the first furnace.

The invention may be understood by reference to the following non-limiting examples. These examples are designed to teach those skilled in the art how to practice the invention and represent the best mode contemplated for practicing the invention. Unless otherwise specified, all parts and percentages are by weight.

EXAMPLE 1

Green coal 44 sized at $1\frac{1}{8} \times 0$ inches and containing 56% fixed carbon, 34% volatile matter, 5% ash, and 5% moisture is introduced into the coal hopper 5. The coal then passes beneath the coal gate 8 which is adjusted to maintain a bed depth on the traveling grate of 5 inches. Simultaneously, green briquets 46 are fed from a hopper 6 by a feeder 9 and fall through a chute 57 onto the coal bed on the traveling grate. The chute 57 is located approximately over the third undergrate air zone so that the coal bed on the traveling grate is ignited when the briquets fall upon it. At the same time, added coal, with the same size consist and proximate analysis as the above-mentioned coal, is introduced from a hopper 7 by a feeder 10 through a chute 58 onto the layer of briquets on the traveling grate. Chutes 57 and 58 extend across the width of the carbonizer so that the briquets and coal are distributed across the width of the grate and are located adjacent to one another so that when the green briquets 46 enter the carbonizer 4 they are immediately covered and surrounded by the coal 48. The ratio of these three feed materials to the carbonizer is 52% coal, 38% green briquets, and 10% coal added on top of the green briquets.

The materials on the traveling grate pass across the undergrate air zones where the coal and green briquets are partially devolatilized by air introduced through the undergrate zones and reach a maximum temperature of 2000° F. at the output end 19 of the carbonizer. The partially devolatilized coal and partially devolatilized green briquets fall into the shaft furnace of soaking pit 22, having a temperature of 1700° F., where their volatile matter content is further reduced to about 2% by their own sensible heat to produce char and carbonized briquets. The char and carbonized briquets then pass to a cooler 26 where they are cooled by inert gas. The char and briquets are discharged from the cooler onto a $1\frac{3}{8}$ inch screen 27. The briquets, being larger than the char, are retained on the screen and are removed as the finished product 56. The char passes through the screen and is conveyed to a crusher 28 where it is crushed to less than $\frac{1}{8}$ inch in size. The crushed char is conveyed to a mixer 30 where it is combined with lignosulfonate liquor containing 56% solids and 44% water. The mixing proportions are 87.5% char and 12.5% lignosulfonate liquor. The lignosulfonate liquor is thoroughly mixed with the crushed char and is fed to a briquetter 40 to produce briquets $2 \times 2 \times 1\frac{1}{4}$ inches. The briquets are then conveyed to a dryer 42. In the dryer, the moisture content of the briquets is reduced to about 2%. The dried green briquets are then conveyed to the green briquet hopper 6 and are subsequently carbonized and cooled in the system as described above.

The briquets have a compression strength of greater than 1000 pounds force and a stability index of greater than 50, as measured by ASTM Procedure D 3402-76.

EXAMPLE 2

Green coal 44 sized at $1\frac{1}{4} \times 0$ inches and containing 56% fixed carbon, 34% volatile matter, 5% ash, and 5% moisture is introduced into the coal hopper 5. The coal then passes beneath the coal gate 8 which is adjusted to maintain a bed depth on the traveling grate of $4\frac{1}{2}$ inches. Simultaneously, green briquets 46 mixed with $\frac{3}{4} \times 0$ inch coal are fed from a hopper 6 by a feeder 9 and fall through a chute 57 onto the coal bed on the traveling grate. The chute 57 is located approximately over the third undergrate zone so that the coal bed on the traveling grate is ignited when the briquets and coal fall upon it. Chute 57 extends across the width of the carbonizer so that the briquets and coal are distributed across the width of the grate. The ratio of the materials fed to the carbonizer is 48% coal fed onto the grate as the first layer, 39% green briquets, and 13% coal mixed with the briquets.

The first three zones of the stoker are downdrafted whereby the gases in the furnace are pulled downwardly through the initial coal bed to preheat, ignite, and partially devolatilize the coal. The tar is removed from these gases for use as a binder, and the gases are returned to the output end of the carbonizer. The remaining undergrate zones of the stoker are updrafted with preheated air which passes through the bed of coal, briquets, and coal mixed with briquets to further devolatilize the intitial layer of coal and begin the devolatilization of the briquets and the coal mixed with the briquets. The coal and briquets reach a temperature of 2000° F. at the output end of the carbonizer. Partially devolatilized coal and partially devolatilized green briquets fall into the shaft furnace or soaking pit 22, having a temperature of 1700° F. where their volatile matter content is further reduced to about 2% by their own sensible heat to produce char and carbonized briquets. The char and carbonized briquets then pass to a cooler 26 where they are cooled by inert gas. The char and briquets are discharged from the cooler to a $1\frac{3}{8}$ inch screen 27. The briquets, being larger than the char, are retained on the screen and are removed as the finished product 56. The char passes through the screen and is conveyed to a crusher 28 where it is crushed to less than $\frac{1}{8}$ inch in size. The crushed char is conveyed to a mixer 30 where it is combined with the tar collected from the downdraft system and lignosulfonate liquor containing 65% solids and 35% water. The ratio of crushed char to tar to lignosulfonate liquor is 87:5:8. The crushed char, tar, and lignosulfonate liquor are thoroughly mixed and fed to a briquetter 40 to produce briquets $2 \times 2 \times 1\frac{1}{4}$ inches in size. The briquets are then conveyed to a dryer 42. In the dryer, the moisture content of the briquets is reduced to about 2%. The dried green briquets are then blended with the $\frac{3}{4} \times 0$ inch coal. The briquets and coal are transferred to the hopper 6 and are subsequently coked and cooled in the system as described above. The briquets have the same characteristics as those produced by the process of Example 1.

The process has many advantages. The time for a complete cycle is relatively short being about 1 hour to 3 hours. The fact that a closed system is employed means that all of the compounds are contained within the process and are not released to the atmosphere thereby avoiding water and atmospheric pollution.

Another advantage of this improved method is that the imminent contact of the briquets and coal enhances condensation of the volatile matter distilled from the coal onto the surface of the briquets. This volatile matter is then driven from the briquets as the briquets are heated leaving behind a layer of pyrolytic graphite that protects and improves the briquet surfaces.

Various conventional surge vessels, storage tanks, and controls, not shown, are incorporated in this system.

Although the invention has been described in considerable detail with reference to certain preferred embodiments thereof it will be understood that variations and modifications can be affected within the spirit and scope of the invention as described above and as defined in the appended claims.

What is claimed is:

1. A process for producing formcoke comprising the steps of:
   I. introducing sized green coal onto a moving chain grate to form a green coal layer,
   II. introducing green briquets uniformly onto the green coal layer to form a green briquet layer wherein the volatile content of the green briquets is greater than 3% by weight based on the weight of the green briquets,
   III. introducing added coal onto the green briquet layer in an amount sufficient to cover the green briquets and the interstices between the green briquets wherein the green coal layer, the green briquet layer and the coal added on top of the green briquets altogether form a bed, and
   IV. charring the bed and reducing the volatile content of the briquets by introducing preheated oxygen containing gas from zoned air boxes below the chain grate to create an updraft through the bed to produce char, and partially coked briquets,
   V. conveying the char and briquets to a post-treatment carbonizer having a reducing atmosphere to further reduce the volatile content of the char and briquets,
   VI. passing the char and briquets from the post-treatment carbonizer through a cooler,
   VII. separating the char from the briquets,
   VIII. crushing the char,
   IX. mixing the char with a binder,
   X. forming the mixture of char and binder into wet briquets,
   XI. drying the wet green briquets to produce dry green briquets,
   XII. employing the dry green briquets in Step II.

2. A process for producing formcoke in the form of finished briquets comprising the steps of:
   I. forming a sized green coal layer
      wherein the sized green coal has a size such that it passes through a screen the wires of which are spaced 1.5 inches apart and
      wherein the green coal has a volatile content greater than 14% based on the moisture and ash free weight of the green coal,
   II. forming a green briquet layer on the green coal layer, wherein the green briquets have a volatile content in excess of 5% by weight based on the weight of the green briquets,
   III. introducing added green coal onto the green briquet layer in an amount sufficient to cover the green briquets and the interstices between the green briquets wherein the green coal layer, the green briquet layer and the added green coal altogether form a bed and
      wherein the additional green coal has a volatile content in excess of 14% based on the moisture and ash free weight of the coal,
   IV. passing air through the bed at a temperature of 0° to 700° F. in order
      A. to reduce the volatile content of the green briquets to less than 6% to produce partially coked briquets,
      B. to reduce the volatile content of the green coal to less than 6%,
      C. to reduce the volatile content of the green coal added on top of the briquets to less than 6%,
      D. to char the sized green coal and green coal added on top of the briquets, wherein the sized green coal and additional green coal are together converted to char,
   V. conveying the char and briquets to a post-treatment carbonizer having a reducing atmosphere to further reduce the volatile content of the char, and to produce fully coked briquets, VI. passing the char and the fully coked briquets from the post-treatment carbonizer through a cooler to produce cooled char and finished briquets, VII. contacting the cooled char and finished briquets with a screen the spacing of the wires of which are smaller than at least two of the dimensions of the finished briquets thereby separating the finished briquets from the char, VIII. crushing the char, IX. mixing the char with a binder, X. forming the mixture of char and binder into wet briquets, XI. drying the wet green briquets to produce dry green briquets, XII. employing the dry green briquets in Step II.

3. A process for producing formcoke in the form of finished briquets comprising the steps of:

I. forming a bed of sized green coal, green briquets and added green coal
   wherein the sized green coal has a size such that it passes through a screen the wires of which are spaced 1.5 inches apart and
   wherein the green coal has a volatile content greater than 14% based on the moisture and ash free weight of the green coal, and
   wherein the added green coal has a volatile content in excess of 14% based on the moisture and ash free weight of the fine coal, II. passing air at 0° to 700° F. through the bed so as to maintain a reducing atmosphere for the green briquets and in order
   A. to reduce the volatile content of the green briquets to less than 6% to produce partially coked briquets,
   B. to reduce the volatile content of the green coal to less than 6%,
   C. to reduce the volatile content of the added green coal to less than 6%,
   D. to char the sized green coal and additional green coal, wherein the sized green coal and additional green coal are together converted to char, III. conveying the char and briquets to a post-treatment carbonizer having a reducing atmosphere to further reduce the volatile content of the char, and to produce fully coked briquets, IV. passing the char and the fully coked briquets from the post-treatment carbonizer through a cooler to produce cooled char and finished briquets, V. contacting the cooled char and finished briquets with a screen the spacing of the wires of which are smaller than at least two of the dimensions of the finished briquets thereby separating the finished briquets from the char, VI. crushing the char, VII. mixing the char with lignosulfonate, VIII. forming the mixture of char and lignosulfonate into wet green briquets, IX. drying the wet green briquets to produce dry green briquets, X. employing the dry green briquets in Step I.

4. A process of claim 1 wherein the charring in step IV proceeds at a temperature between 800° and 4000° F.

5. A process of claim 1 wherein the residence time in step IV is between 3 minutes and 2 hours.

6. A process of claim 1 wherein the post-treatment carbonizer has a temperature of 800° to 3000° F.

7. A process of claim 1 wherein the volatile content of the green briquets is reduced to 1 to 5% by weight after post-treatment carbonization.

8. The process of claim 1 wherein the green coal is sized such that it passes through a wire screen the wires of which are spaced one and one-half inches apart.

9. A process of claim 1 wherein the green briquets have a volatile content of about 3–7%.

10. A process of claim 1 wherein the briquets are larger in two dimensions than the maximum dimension of char emerging from the post-treatment carbonizer.

11. A process of claim 1 wherein the coal added on top of the briquets comprises from 10 to 30% by weight based on the combined weight of the coal added on top of the briquets, and of the initial green coal.

12. A process of claim 1 wherein the binder is selected from the group consisting of furan, coal, clay, Bentonite, low temperature chars, iron ore, molasses, lime, solvent refined coal, lignosulfonate and various combinations of these binders.

13. A process of claim 12 wherein the binder is lignosulfonate with a solids content of 30% to 90% and present in a weight ratio of lignosulfonate solids to char of 1:100 to 40:100.

14. A process for producing formcoke in the form of finished briquets comprising the steps of:

I. forming a sized green coal layer onto a moving chain grate in a carbonizer, wherein the sized green coal has a size such that it passes through a screen the wires of which are spaced 1.5 inches apart and wherein the green coal has a volatile content greater than 14% based on the moisture and ash free weight of the green coal, II. forming a green briquet layer on the green coal layer, wherein the green briquets have a volatile content in excess of 5% by weight based on the weight of the green briquets, III. introducing added green coal onto the green briquet layer in an amount sufficient to cover the green briquets and the interstices between the green briquets wherein the green coal layer, the green briquet layer and the fine green coal altogether form a bed 2 inches to 10 inches in depth and wherein the green coal added on top of the green briquets has a volatile content in excess of 14% based on the weight of the added coal and wherein the added coal comprises from 10 to 30% by weight based on the combined weight of the additional coal and green coal, IV. passing preheated air from zoned air boxes below the chain grate through the bed to have a temperature of 1500° to 3000° F. at the output end of the bed in order
   A. to reduce the volatile content of the green briquets to less than 6% to produce partially coked briquets,
   B. to reduce the volatile content of the green coal to less than 6%,
   C. to reduce the volatile content of the green coal added on top of the green briquets to less than 6%,
   D. to char the sized green coal and green coal added on top of the green briquets, wherein the sized green coal and additional green coal are together converted to char,
   wherein the residence time in the carbonizer is between 10 and 40 minutes, V. conveying the char and briquets to a post-treatment carbonizer having a reducing atmosphere and temperature of 1600 to 1800° F., VI. allowing the char and briquets sufficient residence time in the post-treatment carbonizer to reduce the volatile content to about 2%, and to produce fully coked briquets, VII. passing the char and fully coked briquets from the post-treatment carbonizer through a cooler to produce cooler char and finished briquets, VIII. contacting the cooled char and finished briquets with a screen the spacing of the wires of which are smaller than at least two of the dimensions of the finished briquets thereby separating the finished briquets from the char, IX. crushing the char, X. mixing the char with lignosulfonate binder wherein the solids content of the lignosulfonate binder is 50% to 70%, XI. forming the mixture of char and lignosulfonate binder into wet green briquets with a lignosulfonate solids to char weight ratio of 3:100 to 20:100, XII. drying the wet green briquets to produce dry green briquets, XIII. employing the dry green briquets in Step I.

15. A process for producing formcoke in the form of finished briquets comprising the steps of:

I. forming a sized green coal layer onto a moving chain grate in a carbonizer, wherein the sized green coal has a size such that it passes through a screen the wires of which are spaced 1.5 inches apart and wherein the green coal has a volatile content greater than 14% based on the weight of the green coal, II. forming a green briquet layer on the green coal layer, wherein the green briquets have a volatile content in excess of 5% by weight based on the weight of the green briquets, III. introducing added green coal onto the green briquet layer in an amount sufficient to cover the green briquets and the interstices between the green briquets wherein the green coal layer, the green briquet layer and the additional green coal altogether form a bed 8 inches in depth and wherein the fine green coal has a volatile content in excess of 14% based on the moisture and ash free weight of the fine coal and wherein the added coal comprises from 10 to 30% by weight based on the combined weight of the added coal and green coal, IV. passing preheated air from zoned air boxes below the chain grate through the bed to have a temperature of 2000° F. at the output end of the bed in order A. to reduce the volatile content of the green briquets to less than 6% to produce partially coked briquets, B. to reduce the volatile content of the green coal to less than 6%, C. to reduce the volatile content of the added green coal to less than 6%, D. to char the sized green coal and added green coal, wherein the sized green coal and added green coal are together converted to char, wherein the residence time in the carbonizer is 15 minutes, V. conveying the char and briquets to a post-treatment carbonizer having a reducing atmosphere and temperature of 1700° F., VI. allowing the char and briquets sufficient residence time in the post-treatment carbonizer to reduce the volatile content to about 2%, and to produce fully coked briquets, VII. passing the char and fully coked briquets from the post-treatment carbonizer through a cooler to produce cooled char and finished briquets at 350° F., VIII. contacting the cooled char and finished briquets with a screen the spacing of the wires of which are smaller than at least two of the dimensions of the finished briquets thereby separating the finished briquets from the char, IX. crushing the char, X. mixing the char with calcium lignosulfonate binder wherein the solids content of the lignosulfonate binder is 60%, XI. forming the mixture of char and calcium lignosulfonate binder into wet green briquets with a lignosulfonate solids to char weight ratio of 7:93, XII. drying the wet green briquets to produce dry green briquets, XIII. employing the dry green briquets in Step I.

16. An apparatus for producing formcoke comprising in combination,

I. a furnace having input and output end laterally spaced from one another,

II. a substantially air-imprevious endless grate running horizontally in said furnace including an upper grate run 11 running from the input end of the enclosure to adjacent the output end thereof, III. means for driving said endlss grate so that said upper grate run moves from the input end of the furnace towards the output end thereof, IV. a hopper for introducing coal extending upwardly adjacent the input end of the enclosure and having a lower end disposed over the upper grate run, V. zoned air boxes below the endless grate for introducing oxygen containing gas from supply, VI. conduits located adjacent to each other for introducing green briquets and coal on top of the briquets through the roof of the carbonizer, VII. means for controlling the temperature of the furnace, VIII. a gas outlet conduit communicating with the lower end of the upper grate run and a second shaft furnace, IX. a shaft furnace depending from output end of the first-named furnace, said shaft furnace being positioned to receive char and briquets off the endless grate, and having an exit for removing the char and briquets, X. means for conveying the char and briquets from the shaft furnace to a cooler, XI. a cooler with means for relasing the cooled char and briquets to a separator, XII. a separator positioned to separate the briquets from the char, XIII. a crusher to receive the char from the separator 27, XIV. a mixer to receive char from the crusher and mix char and binder to the desired consistency, XV. a briquetter to receive the mixed char and binder and form the mixture into green briquets, XVI. a dryer to dry the green briquets from the briquetter, XVII. a means to convey the dried green briquets to the furnace.

17. A process of claim 3 wherein the lignosulfonate binder is a mixture of complex polymeric polysulfonic calcium salts from the lignin of sulfite pulp-mill liquors.

* * * * *